United States Patent
Hara et al.

(10) Patent No.: US 11,260,839 B2
(45) Date of Patent: Mar. 1, 2022

(54) BRAKE CONTROL APPARATUS FOR VEHICLE

(71) Applicants: Toyota Jidosha Kabushiki Kaisha, Toyota (JP); Advics Co., Ltd., Kariya (JP)

(72) Inventors: Masahiro Hara, Gotemba (JP); Hiroaki Nagase, Fujisawa (JP); Kei Amamoto, Kariya (JP)

(73) Assignees: TOYOTA JIDOSHA KABUSHIKI KAISHA, Toyota (JP); Advics Co., Ltd., Kariya (JP)

( * ) Notice: Subject to any disclaimer, the term of this patent is extended or adjusted under 35 U.S.C. 154(b) by 329 days.

(21) Appl. No.: 16/593,426

(22) Filed: Oct. 4, 2019

(65) Prior Publication Data
US 2020/0108810 A1    Apr. 9, 2020

(30) Foreign Application Priority Data
Oct. 9, 2018 (JP) .............................. JP2018-190586

(51) Int. Cl.
*B60T 8/1755* (2006.01)
*B60T 8/18* (2006.01)

(52) U.S. Cl.
CPC ........ *B60T 8/1755* (2013.01); *B60T 8/17551* (2013.01); *B60T 8/18* (2013.01); *B60T 2201/16* (2013.01); *B60T 2250/03* (2013.01)

(58) Field of Classification Search
CPC ...... B60T 8/1755; B60T 8/17551; B60T 8/18; B60T 2201/16; B60T 2250/03; B60T 8/26; B60T 8/30; B60T 7/12; B60T 2240/06; B60T 8/1761; B60W 30/045; B60W 10/18
See application file for complete search history.

(56) References Cited

U.S. PATENT DOCUMENTS

| | | | |
|---|---|---|---|
| 7,337,047 B2* | 2/2008 | Ueno | B60T 8/17558 701/38 |
| 2003/0055549 A1* | 3/2003 | Barta | B60W 10/184 701/70 |
| 2005/0029754 A1* | 2/2005 | Ueno | B60T 8/17554 280/5.502 |
| 2020/0094798 A1* | 3/2020 | Hara | B60T 8/17616 |

FOREIGN PATENT DOCUMENTS

| | | | | |
|---|---|---|---|---|
| EP | 1495931 A2 * | 1/2005 | .......... | B60T 8/17554 |
| JP | 2018-062295 A | 4/2018 | | |

* cited by examiner

*Primary Examiner* — Russell Frejd
(74) *Attorney, Agent, or Firm* — Dinsmore & Shohl LLP

(57) ABSTRACT

Provided is a brake control apparatus configured to: set a target slip degree of each of three wheels other than an outer front wheel to a slip degree of the outer front wheel; perform feedback control so that an actual slip degree of each of the three wheels becomes close to the target slip degree; and decrease a feedback control amount of a wheel which is to be controlled to increase an anti-spin yaw moment when an understeer suppression condition is satisfied.

6 Claims, 5 Drawing Sheets

BRAKE CONTROL APPARATUS FOR VEHICLE

CROSS-REFERENCES TO RELATED APPLICATION

The present application claims priority to Japanese patent application No. JP 2018-190586 filed on Oct. 9, 2018, the content of which is hereby incorporated by reference in its entirety.

BACKGROUND

1. Technical Field

The present disclosure relates to a brake control apparatus for a vehicle configured to perform braking force distribution control.

2. Description of the Related Art

Hitherto, in a vehicle such as an automobile, there has been known a technique for performing braking force distribution control for front and rear wheels to limit the increase in braking force applied to the rear wheels when a preset condition is satisfied. This technique ensures the stability of the vehicle during braking. For example, a brake control device for a vehicle (hereinafter, referred to as "related-art device 1") proposed in Japanese Patent Application Laid-open No. 2018-62295 controls, when a degree of deceleration of the vehicle is equal to or larger than a predetermined value, braking forces for right and left rear wheels independently of each other so that a slip degree of each of the right and left rear wheels becomes close to a common target slip degree. For example, the target slip degree is set to an average value of the slip degrees of the right and left rear wheels.

When the center of gravity of the vehicle deviates from the center of the vehicle in a right and left direction of the vehicle, a yaw moment (spin yaw moment) is generated due to the deviation of the center of gravity in such a manner that the vehicle deviates to a side of the wheel having a lower ground contact load. Here, the "ground contact load" means vertical force at the wheel, that is, a component in the vertical direction of force acting on a tire from a road surface. In the case where the ground contact load of the right wheel and the ground contact load of the left wheel are different from each other, the slip degree of the right wheel and the slip degree of the left wheel are also different from each other. The smaller the ground contact load, the larger the slip degree.

The related-art device 1 controls the braking forces for the right and left rear wheels independently of each other so that the slip degree of each of the right and left rear wheels becomes close to the common target slip degree as described above. Therefore, the braking force of the rear wheel having a lower slip degree becomes larger than the braking force of the rear wheel having a larger slip degree. In other words, the braking force of the rear wheel having a larger slip degree becomes smaller than the braking force of the rear wheel having a lower slip degree. The related-art device 1 generates an anti-spin yaw moment through the difference between the braking forces of the right and left rear wheels in this manner to thereby suppress the deviation of the vehicle.

It is assumed that the braking force distribution control in the related-art device 1 described above is applied to a situation in which the vehicle is turning. At the time of turning of the vehicle, a difference between a load on the right side and a load on the left side in a vehicle body (i.e., difference between the ground contact load of the right wheel and the ground contact load of the left wheel) becomes more remarkable than that at the time of straight traveling. For this reason, in order to improve the stability of the vehicle during braking, it is conceivable to control braking forces not only for the rear wheels but also for the front wheels so that the difference in the slip degree between the left and right front wheels can be suppressed/eliminated.

However, when the braking forces for the right and left front wheels are controlled in addition to the braking forces for the rear wheels, this braking force distribution control may cause an excessive anti-spin yaw moment.

SUMMARY

The present disclosure provides a brake control apparatus configured to perform braking force distribution control for improving a vehicle turning behavior in a situation in which the vehicle is turning while braking.

A brake control apparatus according to one embodiment is configured to generate an anti-spin yaw moment in a direction opposite to a spin yaw moment generated through a load movement in a right and left direction of the vehicle.

The brake control apparatus includes: a brake device configured to control braking forces of right and left front wheels, and right and left rear wheels independently of each other; a slip degree detector configured to detect a slip degree for each of the right and left front wheels, and the right and left rear wheels; a rear braking force controller configured to control the braking forces of the right and left rear wheels independently of each other through feedback control based on a rear wheel slip deviation so that the slip degree of each of the right and left rear wheels becomes close to a target slip degree, the rear wheel slip deviation including a deviation between the target slip degree and the slip degree of the right rear wheel, and a deviation between the target slip degree and the slip degree of the left rear wheel; a turning state detector configured to detect a turning state of the vehicle; and a front braking force controller configured to, when the turning state of the vehicle is detected by the turning state detector, control the braking force of an inner front wheel, which is the front wheel on an inner side with respect to a turning direction of the vehicle from among the right and left front wheels, through feedback control based on a front wheel slip deviation so that the slip degree of the inner front wheel becomes close to the slip degree of an outer front wheel as a reference wheel, which is the front wheel on an outer side with respect to the turning direction of the vehicle from among the right and left front wheels, the front wheel slip deviation being a deviation between the slip degree of the reference wheel and the slip degree of the inner front wheel.

Furthermore, the brake control apparatus includes: a vehicle state estimation module configured to estimate whether or not the vehicle is in an understeer state in a situation in which the front braking force controller is controlling the braking force of the inner front wheel; and an understeer suppressing module configured to, when the vehicle state estimation module has estimated that the vehicle is in the understeer state, decrease a feedback control amount of the wheel which is to be controlled to increase the anti-spin yaw moment.

The brake control apparatus includes the brake device, the slip degree detector, the rear braking force controller, the turning state detector, and the front braking force controller. The brake device is capable of controlling braking forces of the right and left front wheels, and the right and left rear wheels independently of each other. The slip degree detector is configured to detect each slip degree (for example, slip ratio) of the right and left front wheels and the right and left rear wheels. The rear braking force controller is configured to control the braking forces of the right and left rear wheels independently of each other through the feedback control based on the rear wheel slip deviation so that the slip degree of each of the right and left rear wheels becomes close to the target slip degree. The rear wheel slip deviation includes the deviation between the target slip degree and the slip degree of the right rear wheel, and the deviation between the target slip degree and the slip degree of the left rear wheel.

The turning state detector is configured to detect the turning state of the vehicle. The front braking force controller is configured to, when the turning state of the vehicle is detected by the turning state detector, control the braking force of the inner front wheel, which is the front wheel on the inner side with respect to the turning direction of the vehicle from among the right and left front wheels, through the feedback control based on the front wheel slip deviation so that the slip degree of the inner front wheel becomes close to the slip degree of the outer front wheel as the reference wheel, which is the front wheel on the outer side with respect to the turning direction of the vehicle from among the right and left front wheels. The front wheel slip deviation is the deviation between the slip degree of the reference wheel and the slip degree of the inner front wheel.

The brake control apparatus for the vehicle can generate an anti-spin yaw moment in an opposite direction to a spin yaw moment on the vehicle which is generated due to a load movement in the right and left direction of the vehicle (i.e., movement in the right and left direction of the center of gravity of the vehicle). Therefore, the stability of the vehicle during braking can be enhanced. However, there is a possibility that the anti-slip yaw moment generated through the above braking force control becomes excessive.

The brake control apparatus further includes the vehicle state estimation module and the understeer suppressing module. The vehicle state estimation module is configured to estimate whether or not the vehicle is in the understeer state in the situation in which the front braking force controller is controlling the braking force of the inner front wheel. For example, the vehicle state estimation module may be configured to, based on a yaw rate of the vehicle detected by a yaw rate sensor and a reference yaw rate calculated from a state of the vehicle without using the yaw rate sensor, estimate that the vehicle is in the understeer state when a magnitude (absolute value) of the detected yaw rate is smaller than a magnitude of the reference yaw rate.

The understeer suppressing module is configured to, when the vehicle state estimation module has estimated that the vehicle is in the understeer state, decrease the feedback control amount of the wheel which is to be controlled to increase the anti-spin yaw moment. For example, the understeer suppressing module may be configured to specify the wheel which is to be controlled to increase the anti-spin yaw moment, and decrease the feedback control amount only for the specified wheel.

The "wheel which is to be controlled to increase the anti-spin yaw moment" includes a first wheel which is a wheel (hereinafter, simply referred to as "outer wheel") on the outer side with respect to the turning direction of the vehicle, and is to be controlled to increase the braking force. In other words, the first wheel is a wheel of which the slip degree is smaller than the target slip degree, and of which the feedback control amount is calculated to be a value for increasing the braking force. The "wheel which is to be controlled to increase the anti-spin yaw moment" further includes a second wheel which is a wheel (hereinafter, simply referred to as "inner wheel") on the inner side with respect to the turning direction of the vehicle, and is to be controlled to decrease the braking force. In other words, the second wheel is a wheel of which the slip degree is larger than the target slip degree, and of which the feedback control amount is calculated to be a value for decreasing the braking force.

In order to decrease the feedback control amount of the wheel which is to be controlled to increase the anti-spin yaw moment, the feedback control amount for that wheel may be set to zero. However, the feedback control amount may not necessarily be set to zero, and may be controlled so that the feedback control amount approaches zero.

As a result, the brake control apparatus can suppress an excessive anti-spin yaw moment, and therefore, an appropriate turning behavior of the vehicle can be obtained during braking and turning of the vehicle.

In an aspect of the brake control apparatus, the rear braking force controller is further configured to set the target slip degree to the same value as the slip degree of the outer front wheel.

In this aspect, the target slip degree for each of the right and left rear wheels is set to the same value as the slip degree of the outer front wheel (the slip degree of the outer front wheel detected by the slip degree detector). The braking force for each of three wheels other than the outer front wheel is controlled through the feedback control based on the deviation from the slip degree of the outer front wheel so that the slip degree of each of the three wheels becomes close to the slip degree of the outer front wheel.

An aspect of the brake control apparatus further includes a correcting module configured to: perform a first correcting processing so that a feedback control amount of the inner front wheel based on the front wheel slip deviation is corrected to be zero; and perform a second correcting processing so that a feedback control amount of an inner rear wheel, which is the rear wheel on the inner side with respect to the turning direction of the vehicle from among the right and left rear wheels, is corrected by an amount corresponding to the corrected amount of the feedback control amount of the inner front wheel.

Generally, the braking force is largely distributed/applied to the front wheel compared to the rear wheel. An actual change in the braking force of the front wheel due to the change in a braking pressure becomes more remarkable than that of the rear wheel. Therefore, a change (correction amount) in the vehicle behavior on the front wheel by the braking force control is larger than that on the rear wheel. Therefore, in order to further enhance the stability of the turning behavior of the vehicle, the braking force of the front wheel may not be adjusted.

Therefore, the brake control apparatus according to this aspect further includes the correcting module. The correcting module is configured to perform the first correcting processing so that the feedback control amount of the inner front wheel based on the front wheel slip deviation is corrected to be zero. The brake control apparatus does not generate an anti-spin yaw moment to be originally generated by the front braking force controller. Further, the correcting module is configured to perform the second correcting processing so that the feedback control amount of the inner rear wheel, which is the rear wheel on the inner side with respect to the turning direction of the vehicle from among the right and left rear wheels, is corrected by the amount corresponding to the corrected amount of the feedback control amount of the inner front wheel.

The brake control apparatus can correct the feedback control amount of the inner rear wheel so that an anti-spin yaw moment, which should be originally generated through use of the feedback control amount for the braking force of the inner front wheel, can be generated through the feedback control for the inner rear wheel. Therefore, an appropriate anti-spin yaw moment can be generated through the braking force control of the inner rear wheel without performing the braking force control of the inner front wheel. According to this aspect, the stability of the turning behavior of the vehicle can be further enhanced.

When correcting the feedback control amount of the inner front wheel, for example, the slip deviation of the inner front wheel may be set to zero. In addition, when correcting the feedback control amount of the inner rear wheel, for example, the slip deviation of the inner rear wheel may be corrected so that the slip deviation of the inner rear wheel increases as the slip deviation of the inner front wheel increases.

An aspect of the brake control apparatus further includes an inner front wheel braking force controller configured to: calculate a relationship between a specific outer front wheel braking force and a target braking force of the inner front wheel, the specific outer front wheel braking force being a value obtained by multiplying an actual braking force of the outer front wheel by a load ratio which is a ratio of a ground contact load of the inner front wheel to a ground contact load of the outer front wheel; and correct the feedback control amount of the inner front wheel to be zero when the target braking force of the inner front wheel becomes equal to or smaller than the specific outer front wheel braking force.

When performing the feedback control of the braking force for the inner front wheel so that a slip ratio of the inner front wheel follows a slip ratio of the outer front wheel, the braking force is distributed to each wheel in proportion to the ground contact load of each wheel. Meanwhile, in order to suppress the understeer state of the vehicle, it is considered that limiting the difference in the braking force between the right and left wheels allows to prevent from generating an excessive anti-spin yaw moment.

In this aspect, the inner front wheel braking force controller is configured to set the feedback control amount of the inner front wheel to zero when the target braking force of the inner front wheel becomes equal to or smaller than the specific outer front wheel braking force. The specific outer front wheel braking force is a value obtained by multiplying the actual braking force of the outer front wheel by the load ratio which is the ratio of the ground contact load of the inner front wheel to the ground contact load of the outer front wheel.

Therefore, the braking force of the inner front wheel is limited so as not to provide a difference in the braking force between the right and left wheels which exceeds a distribution ratio of the braking force in the slip control (i.e., common slip control as described later) in which the slip ratios of the right and left wheels are controlled/adjusted to a target value. As a result, the inner front wheel braking force controller according to this aspect can suppress the understeer state of the vehicle appropriately.

In an aspect of the brake control apparatus, the correcting module is further configured to correct the feedback control amount of the inner front wheel based on the front wheel slip deviation in such a manner that the front wheel slip deviation is corrected to be zero.

According to this aspect, the correcting module corrects the front wheel slip deviation so as to be zero. Therefore, the feedback control amount of the inner front wheel based on the front wheel slip deviation can be corrected to be zero in a suitable manner. The above correcting processing of the slip deviation is a correcting (adjusting) processing to make the wheel appear to be slipping (or not slipping) in the braking force control.

An aspect of the brake control apparatus further includes a yaw rate sensor. Further, the vehicle state estimation module is configured to compare a yaw rate detected by the yaw rate sensor with a reference yaw rate, and estimate/determine that the vehicle is in the understeer state when a magnitude of the detected yaw rate is smaller than a magnitude of the reference yaw rate.

In this aspect, the vehicle state estimation module is configured to compare the yaw rate detected by the yaw rate sensor with the reference yaw rate. The reference yaw rate is a yaw rate calculated based on state values (including a vehicle speed, a steering angle, a lateral acceleration, and the like) of the vehicle and various factors (specification values) of the vehicle. The vehicle state estimation module is configured to determine that the vehicle is in the understeer state when the magnitude of the detected yaw rate is smaller than the magnitude of the reference yaw rate. Therefore, it is possible to appropriately estimate that the vehicle is in the understeer state. As a result, an excessive anti-spin yaw moment can be suppressed, and therefore, an appropriate turning behavior of the vehicle can be obtained during braking and turning of the vehicle.

According to one or more embodiments, one or more of the above-mentioned controllers and modules may be implemented by a microprocessor programmed for performing one or more operations and/or functionality described herein. According to one or more embodiments, one or more of the above-mentioned controllers may be implemented, in whole or in part, by specifically configured to hardware (e.g., by one or more application specific integrated circuits or ASIC(s)).

In the above description, in order to facilitate understanding of the present disclosure, a name and/or reference numeral used in the embodiments of the present disclosure described later is enclosed in parentheses and assigned to each of the constituent features corresponding to the embodiments. However, each of the constituent features is not limited to the embodiments defined by the name and/or reference numeral.

DETAILED DESCRIPTION

Now, referring to the accompanying drawings, a description is given of a brake control apparatus for a vehicle according to one or more embodiments of the present disclosure.

Figure 1:
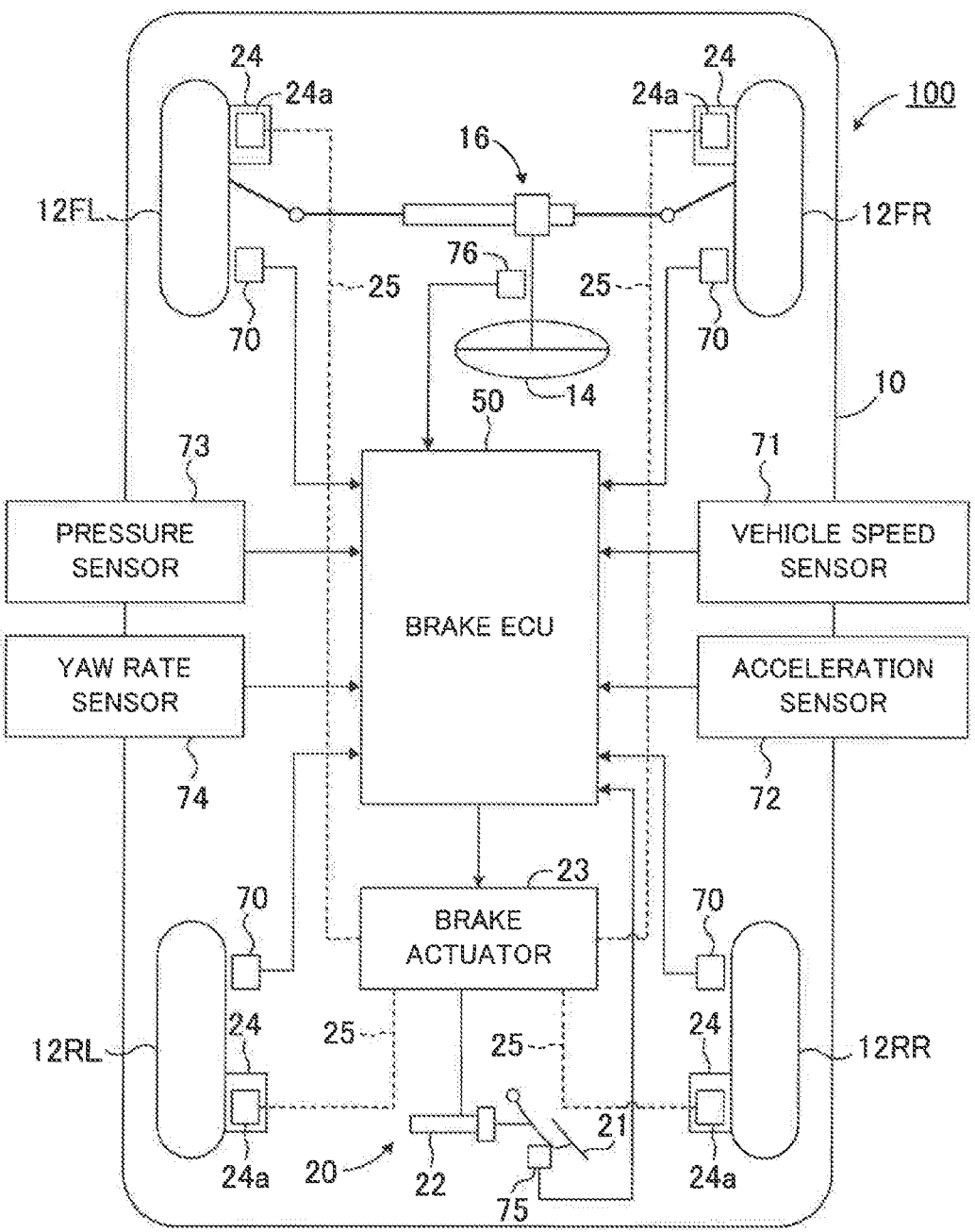
FIG. 1 is a schematic configuration diagram for illustrating a brake control apparatus for a vehicle according to an embodiment of the present disclosure.

FIG. 1 is a schematic configuration diagram for illustrating a brake control apparatus 100 for a vehicle according to an embodiment of the present disclosure. A vehicle 10 to which the brake control apparatus 100 is applied includes a left front wheel 12FL, a right front wheel 12FR, a left rear wheel 12RL, and a right rear wheel 12RR. Hereinafter, those wheels are collectively referred to as "wheels 12". The right and left front wheels 12FL and 12FR are steered wheels. The right and left front wheels 12FL and 12FR are steered by a rack and pinion-type steering device 16 driven in response to a steering operation of a steering wheel 14 by a driver.

The vehicle 10 includes a brake device 20, and a brake ECU 50 configured to control an operation of the brake device. The brake ECU 50 is connected to other ECUs (including an engine ECU, and the like) so as to be able to mutually transmit and receive information via a controller area network (CAN) (not shown). Those ECUs are electric control units each including a microcomputer as a main part. The microcomputer herein includes a CPU, a ROM, a RAM, a non-volatile memory, an interface I/F, and the like. The CPU executes instructions (programs and routines) stored in the ROM to realize various functions.

The brake device 20 includes a brake pedal 21, a master cylinder 22, a brake actuator 23, a plurality of brake mechanisms 24, and a hydraulic piping 25. The master cylinder 22 is configured to generate a hydraulic pressure corresponding to a depression amount of the brake pedal 21, and supply the generated hydraulic pressure to the brake actuator 23. The brake actuator 23 includes a hydraulic circuit interposed between the master cylinder 22 and the brake mechanisms 24. The hydraulic circuit includes an electric pump for boosting a braking hydraulic pressure without relying on the master cylinder pressure, a reservoir for storing a brake hydraulic fluid, and a plurality of solenoid valves.

The brake actuator 23 is connected to the brake mechanisms 24 via the hydraulic piping 25. The brake mechanism 24 is provided on each of the wheels 12. The brake mechanism 24 includes a brake disc configured to rotate with the wheel 12, and a brake caliper fixed to a vehicle body. The brake mechanism 24 is configured to cause a brake pad to press against the brake disc through use of a hydraulic pressure of a wheel cylinder 24a provided in the brake caliper to thereby generate a friction braking force. In this manner, the brake mechanism 24 can generate a braking force corresponding to the braking hydraulic pressure supplied from the brake actuator 23.

The brake actuator 23 controls the plurality of solenoid valves provided in the hydraulic circuit to adjust the braking hydraulic pressures applied to the wheels 12 independently of each other. The braking force applied to each wheel is adjusted/set in response to the braking hydraulic pressure supplied to each wheel cylinder 24a.

The brake ECU 50 is electrically connected to the brake actuator 23, and outputs control signals to the solenoid valves and the pump provided in the brake actuator 23. The brake ECU 50 can control the operation of the brake actuator 23 through use of the control signals to thereby control the braking forces of wheels 12 independently of each other. In a situation in which the operation of the brake actuator 23 is not controlled, the hydraulic pressure of the master cylinder 22 is supplied to the four wheel cylinders 24a. The braking forces are distributed so that the braking forces applied to the front wheels 12FL and 12FR become larger than the braking forces applied to the rear wheels 12RL and 12RR.

The brake ECU 50 is connected to a plurality of wheel speed sensors 70, a vehicle speed sensor 71, an acceleration sensor 72, a pressure sensor 73, a yaw rate sensor 74, a brake pedal depression force sensor 75, and a steering angle sensor 76, and is configured to receive detection signals output from those sensors. The wheel speed sensor 70 is provided in each of wheels 12, and is configured to output a detection signal indicative of a wheel speed corresponding to a rotation speed of the wheel 12. The vehicle speed sensor 71 is configured to output a detection signal indicative of a speed of the vehicle body (vehicle speed). The acceleration sensor 72 is configured to output a detection signal indicative of an acceleration (longitudinal acceleration) in a front and rear direction (longitudinal direction) of the vehicle and a detection signal indicative of an acceleration (lateral acceleration) in a right and left direction (lateral direction) of the vehicle. The pressure sensor 73 is configured to output a detection signal indicative of a pressure of the master cylinder 22 and a detection signal indicative of a pressure of each of the wheel cylinders 24a. The yaw rate sensor 74 is configured to output a detection signal indicative of a yaw rate of the vehicle. The brake pedal depression force sensor 75 is configured to output a detection signal indicative of a depression force input to the brake pedal by the driver. The steering angle sensor 76 is configured to output a detection signal indicative of a steering angle of the steering wheel.

The steering angle sensor 76 detects a steering angle St. The steering angle St is "0" when the vehicle travels straight. The steering angle St has a positive value when the vehicle is turned in a left turning direction, and has a negative value when the vehicle is turned in a right turning direction. The yaw rate sensor 74 detects an actual yaw rate YR. Similar to the steering angle sensor 76, the actual yaw rate YR is "0" when the vehicle travels straight. The actual yaw rate YR has a positive value when the vehicle is turned in the left turning direction, and has a negative value when the vehicle is turned in the right turning direction. The acceleration sensor 72 detects a lateral acceleration Gy. Similar to the steering angle sensor 76, the lateral acceleration Gy is "0" when the vehicle travels straight. The lateral acceleration Gy has a positive value when the vehicle is turned in the left turning direction, and has a negative value when the vehicle is turned in the right turning direction.

Next, EBD (Electronic Brake force Distribution) control implemented by the brake ECU 50 will be described.

Generally, in order to ensure the stability of the vehicle at the time of braking, distribution control of the braking force between the front wheels and the rear wheels is performed. Such braking force distribution control is called "EBD control". In the EBD control in the related-art device 1 described above, the target slip ratio (target slip degree) of each of the right and left rear wheels is set to the common target slip ratio (average value of the slip ratios of the right and left front wheels). In this manner, in a situation in which the center of gravity of the vehicle deviates from the center of the vehicle in the right and left direction, the related-art device 1 generates a difference in the braking force between the right and left rear wheels to thereby generate an anti-spin yaw moment. This anti-spin yaw moment acts to reduce a turning yaw moment (spin yaw moment) caused by the deviation of the center of gravity. The above-mentioned control can ensure a stable behavior of the vehicle in a situation in which the driver causes the vehicle to travel straight.

Meanwhile, when the vehicle is turning due to an operation of the steering wheel by the driver or automatic steering control, a difference between a load on the right side and a load on the left side in the vehicle body (i.e., difference between a ground contact load of the right wheel and a ground contact load of the left wheel) becomes more remarkable as compared to when traveling straight. Therefore, the above-mentioned control cannot generate an anti-spin yaw moment sufficient to reduce the spin yaw moment.

For the above problem, the brake control apparatus according to this embodiment is configured to switch processing of the EBD control between the following situations (i) and (ii):

(i) a situation in which the center of gravity of the vehicle largely deviates from the center of the vehicle in the right and left direction (a degree of deviation of the center of gravity of the vehicle is large). In other words, a situation in which the vehicle is turning; and (ii) a situation in which the degree of deviation of the center of gravity of the vehicle is not large.

The brake ECU 50 performs "rear-wheel EBD control" when a magnitude |Gy| of the lateral acceleration Gy detected by the acceleration sensor 72 is smaller than a turning determination threshold Gyref. Meanwhile, the brake ECU 50 performs "front/rear-wheel EBD control" when the magnitude |Gy| of the lateral acceleration Gy is equal to or larger than the turning determination threshold Gyref. Hereinafter, the rear-wheel EBD control and the front/rear-wheel EBD control are collectively referred to as "EBD control" unless it is required to distinguish between those controls.

The rear-wheel EBD control is similar to the EBD control in the related-art device 1 described above. The brake ECU 50 calculates an average value of slip ratios of the right and left front wheels, and sets the average value as a target slip ratio for each of the right and left rear wheels. The brake ECU 50 calculates a slip deviation which is a deviation between the target slip ratio and an actual slip ratio for each of the right and left rear wheels. The brake ECU 50 independently controls the braking force of the right rear wheel and the braking force of the left rear wheel through feedback control based on the slip deviation so that the actual slip ratio of each of the right and left rear wheels follows (becomes close to) the target slip ratio. Further, the feedback control is not performed for the right and left front wheels. The hydraulic pressure corresponding to the depression force (depression amount) of the brake pedal by the driver is supplied to the wheel cylinder of each of the right and left front wheels. Therefore, the braking force requested by the driver is applied to the right and left front wheels.

Therefore, in a situation in which the center of gravity of the vehicle deviates from the center of the vehicle in the right and left direction, the brake control apparatus generates a difference in the braking force between the right and left rear wheels in the above manner. This causes to increase the braking force of the rear wheel of which the ground contact load is larger, and decrease the braking force of the rear wheel of which the ground contact load is smaller. As a result, the brake control apparatus can generate an anti-spin yaw moment acting to reduce a spin yaw moment caused by the deviation of the center of gravity of the vehicle.

In the front/rear-wheel EBD control, the brake ECU 50 sets, as a reference wheel, the wheel on an outer side with respect to the turning direction of the vehicle from among the right and left front wheels. The brake ECU 50 sets an actual slip ratio of the reference wheel as the target slip ratio for each of the other three wheels. Hereinafter, the "wheel on the outer side with respect to the turning direction of the vehicle from among the right and left front wheels" is simply referred to as "outer front wheel". Further, the "wheel on an inner side with respect to the turning direction of the vehicle from among the right and left front wheels" is simply referred to as "inner front wheel". In addition, the "wheel on the outer side with respect to the turning direction of the vehicle from among the right and left rear wheels" is simply referred to as "outer rear wheel", and the "wheel on the inner side with respect to the turning direction of the vehicle from among the right and left rear wheels" is simply referred to as "inner rear wheel".

When performing the front/rear-wheel EBD control, the brake ECU 50 determines the turning direction of the vehicle based on the lateral acceleration Gy detected by the acceleration sensor 72. The brake ECU 50 sets, as the reference wheel, the outer front wheel determined based on the turning direction of the vehicle. The brake ECU 50 detects actual slip ratios of the four wheels, and sets the actual slip ratio of the reference wheel as the target slip ratio for each of the other three wheels (the inner front wheel, the inner rear wheel, and the outer rear wheel). The brake ECU 50 calculates a slip ratio deviation (="target slip ratio"–"actual slip ratio") for each of the other three wheels. The brake ECU 50 controls the braking forces of the other three wheels independently of each other through feedback control based on those slip ratio deviations so that the actual slip ratio of each of the other three wheels follows (becomes close to) the target slip ratio (the actual slip ratio of the reference wheel).

When the braking force is controlled for each of the other three wheels in the above manner, it is possible to generate an anti-spin yaw moment not only on the rear wheels, but also on the front wheels through the difference in the braking force between the right and left wheels.

However, when the braking force is controlled for each of the other three wheels, the braking force is controlled not only on the rear wheels but also on the inner front wheel. The braking force is largely distributed/applied to the inner front wheel compared to each of the rear wheels. An actual change in the braking force of the inner front wheel due to the change in the braking hydraulic pressure becomes more remarkable than that of each of the rear wheels. Therefore, the change (correction amount) of the vehicle behavior on the front wheel side by the braking force control is larger than that on the rear wheel side. In addition, since the hydraulic circuit has more brake fluid on the front wheel side than the rear wheel side, the brake actuator 23 may generate large amounts of operation noise. As a result, noise performance and vibration performance may be deteriorated.

Therefore, in the front/rear-wheel EBD control, the brake ECU 50 corrects a feedback control amount of the inner front wheel and a feedback control amount of the inner rear wheel so that the braking force control on the inner rear wheel generates/causes an anti-spin yaw moment corresponding to a feedback control amount calculated based on the slip deviation of the inner front wheel.

Figure 2:
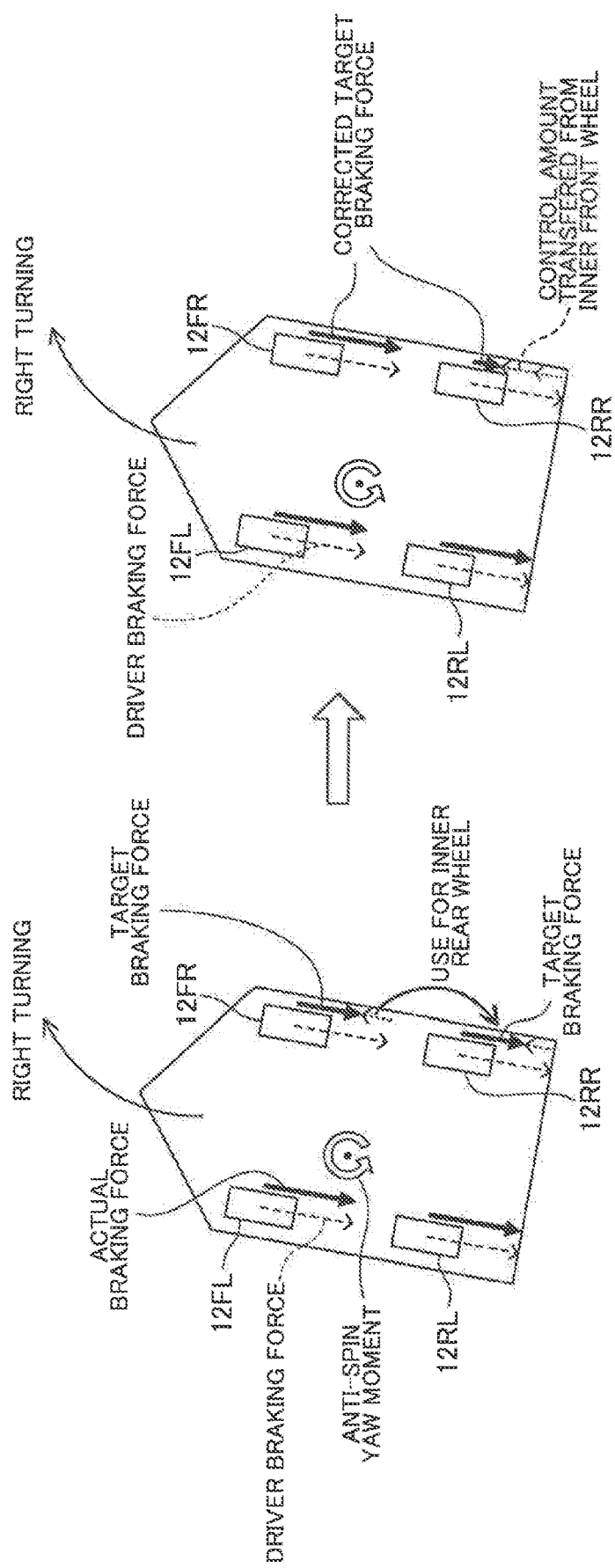
FIG. 2A is a first diagram for illustrating an example for using a control amount of an inner front wheel as a control amount of an inner rear wheel.
FIG. 2B is a second diagram for illustrating the example for using the control amount of the inner front wheel as the control amount of the inner rear wheel.

For example, as illustrated in FIG. 2A, in a situation in which the vehicle is turning right, the center of gravity of the vehicle moves in the left direction, and therefore, the slip ratios of the right wheels 12FR and 12RR of which the ground contact loads are smaller become larger than the slip ratios of the left wheels 12FL and 12RL. When the outer front wheel 12FL is set as the reference wheel and the braking force control is performed for each of the other three wheels, a feedback control amount of the inner front wheel 12FR is calculated so that the braking force of the inner front wheel 12FR is decreased, and a feedback control amount of the inner rear wheel 12RR is calculated so that the braking force of the inner rear wheel 12RR is decreased. When the feedback control of the braking force is performed through use of the calculated feedback control amount for each of the inner and outer front wheels 12FR and 12RR, the above-mentioned problem may occur because the braking force of the inner front wheel 12FR is controlled.

For solving the above-mentioned problem, in the front/rear-wheel EBD control, the brake ECU 50 corrects the feedback control amount of the inner front wheel 12FR and the feedback control amount of the inner rear wheel 12RR as illustrated in FIG. 2B. The braking force to be decreased on the inner front wheel 12FR is not used for the inner front wheel 12FR, but used for the inner rear wheel 12RR. That is, the feedback control amount for generating an anti-spin yaw moment on the inner front wheel 12FR (feedback control amount of the inner front wheel 12FR) is used for the inner rear wheel 12RR.

The expression "the feedback control amount of the inner front wheel is used for the inner rear wheel" means that the braking force corresponding to (the whole or a part of) the feedback control amount is not generated on the inner front wheel, and the feedback control amount corresponding to that braking force which is not generated on the inner front wheel is added to the feedback control amount of the inner rear wheel. In other words, the feedback control amount of the inner front wheel is transferred (diverted) to the feedback control amount of the inner rear wheel. Hereinafter, the "feedback control amount" is simply referred to as "control amount".

For example, the control amount of the inner front wheel is set in response to the slip ratio deviation the between the outer front wheel (reference wheel) and the inner front wheel (i.e., difference in the slip ratio between the reference wheel and the inner front wheel). In order to use the whole or a part of the control amount for generating an anti-spin yaw moment on the inner front wheel for the control amount of the inner rear wheel, the brake ECU 50 corrects the slip ratio deviation of the inner front wheel and the slip ratio deviation of the inner rear wheel as follows. The brake ECU 50 adds the slip ratio deviation of the inner front wheel to the slip ratio deviation of the inner rear wheel, and then, sets the slip ratio deviation of the inner front wheel to zero. A control gain of the braking force generated on the front wheel with respect to the slip ratio deviation and a control gain of the braking force generated on the rear wheel with respect to the slip ratio deviation are different from each other. Therefore, the brake ECU 50 may correct the slip ratio deviation of the inner front wheel and the slip ratio deviation of the inner front wheel in view of those control gains. Each of the control gains is set to a value corresponding to the ground contact load of each wheel.

In the above manner, both of the slip ratio deviation of the right front wheel and the slip ratio deviation of the left front wheel become apparently zero. Further, an anti-spin yaw moment to be generated on the inner front wheel can be generated on the inner rear wheel.

In the front/rear-wheel EBD control, the brake ECU 50 decreases the braking force of the inner rear wheel. Therefore, when the control amount has reached a limit of the braking force control on the inner rear wheel (the pressure of the wheel cylinder becomes zero or a value close to zero), the brake ECU 50 limits the addition of the control amount of the inner front wheel to the control amount of the inner rear wheel. That is, the control amount to be transferred (diverted) from the inner front wheel to the inner rear wheel is limited.

In the front/rear-wheel EBD control, the control amount of the inner front wheel is added to the control amount of the inner rear wheel in some embodiments. When a degree of the turning of the vehicle is small, the brake ECU 50 may add the whole of the control amount of the inner front wheel (control amount for generating an anti-spin yaw moment, that is, decreasing the braking hydraulic pressure) to the control amount of the inner rear wheel. On the other hand, when the degree of the turning of the vehicle becomes larger, the brake ECU 50 may limit the control amount of the inner front wheel to be added to the inner rear wheel.

According to this embodiment, in a situation in which the braking force of the inner rear wheel is not zero (that is, the pressure in the wheel cylinder of the inner rear wheel is not zero or a value close to zero), the brake ECU 50 adds the whole of the control amount (for decreasing the pressure) of the inner front wheel to the control amount of the inner rear wheel. Even in a situation in which the braking force of the inner rear wheel is zero, the brake ECU 50 adds the whole of the control amount (for decreasing the pressure) of the inner front wheel to the control amount of the inner rear wheel when the following Conditions X1 and X2 are satisfied.

Condition X1: The braking hydraulic pressure in the inner rear wheel is to be increased.

Condition X2: An anti-spin yaw moment to be generated through pressure decreasing control on the inner front wheel is equal to or smaller than a spin yaw moment to be generated through pressure increasing control on the inner rear wheel.

In a situation in which the braking force of the inner rear wheel is zero (that is, the pressure in the wheel cylinder of the inner rear wheel is zero or a value close to zero), the brake ECU 50 adds only an "amount corresponding to the control amount of the inner rear wheel for increasing the pressure" in the control amount (for decreasing the pressure) of the inner front wheel to the control amount of the inner rear wheel when the following Conditions Y1 and Y2 are satisfied.

Condition Y1: The braking hydraulic pressure in the inner rear wheel is to be increased.

Condition Y2: An anti-spin yaw moment to be generated through the pressure decreasing control on the inner front wheel is larger than a spin yaw moment to be generated through the pressure increasing control on the inner rear wheel.

Further, the brake ECU 50 controls the braking force of the inner front wheel through use of the remaining control amount of the inner front wheel which is not added to the control amount of the inner rear wheel.

For using the control amount of the inner front wheel for the inner rear wheel, the brake ECU 50 corrects the slip ratio deviations through a correcting processing routine described later.

The EBD control is performed independently for each wheel. When the slip ratio of the wheel exceeds the slip ratio of the reference wheel, the EBD control is started for that wheel. For example, in the case where the vehicle is turning, when the outer front wheel is set as the reference wheel and the slip ratio of a wheel among the other three wheels exceeds the slip ratio of the outer front wheel, the front/rear-wheel EBD control is started for that wheel. In the case where the vehicle is not turning (traveling straight), when the slip ratio of a rear wheel among the right and left rear wheels exceeds the average value of the slip ratios of the right and left front wheels, the rear-wheel EBD control is started for that rear wheel. In addition, a dead zone value having a certain size may be added to the slip ratio of the reference wheel (or the average value of the slip ratios of the right and left front wheels) used for determining the start of the EBD control. Therefore, in consideration of the dead zone value, when the slip ratio of a wheel exceeds a specific value (="slip ratio"+"dead zone value") obtained based on the slip ratio of the reference wheel and the dead zone value, the front/rear-wheel EBD control may be started for that wheel. When the slip ratio of a rear wheel among the right and left rear wheels exceeds a specific value (="average value of slip ratios"+"dead zone value") obtained based on the average value of the slip ratios of the right and left front wheels and the dead zone value, the rear-wheel EBD control may be started for that rear wheel.

As the EBD control is started, the braking hydraulic pressure controlled by the brake actuator 23 is supplied to the wheel cylinder 24a of a target wheel to be controlled, in place of the hydraulic pressure supplied from the master cylinder so far.

<Correcting Processing>

Figure 3:
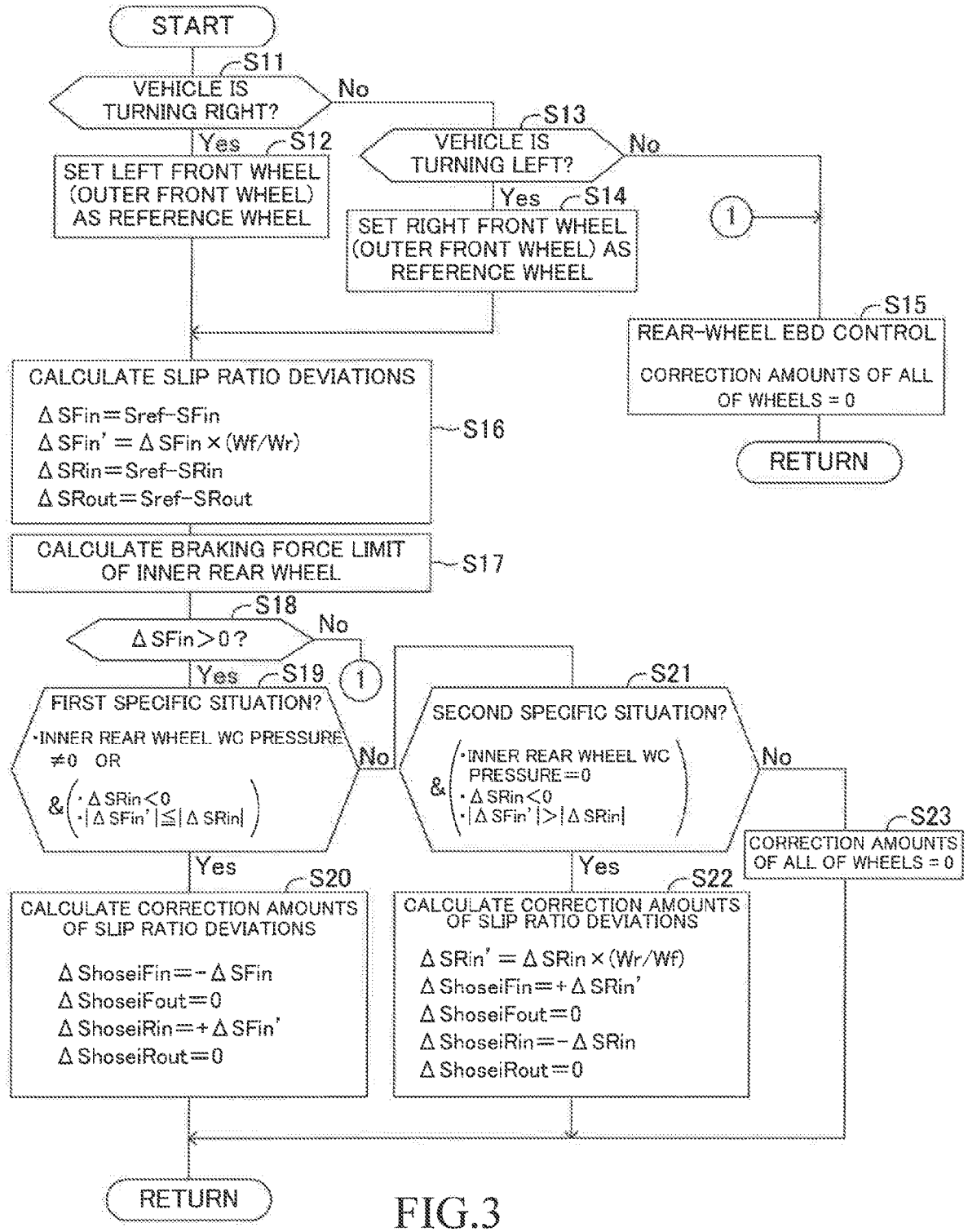
FIG. 3 is a flowchart for illustrating a correcting processing routine executed by a brake ECU.

Next, an example of a correcting processing executed by the brake ECU 50 will be described. FIG. 3 illustrates a correcting processing routine. The brake ECU 50 executes the correcting processing routine every time a predetermined calculation period elapses. The correcting processing routine is a control processing for correcting the slip ratio deviations used for the EBD control.

In Step S11, the brake ECU 50 determines whether or not the vehicle is turning right. In this step, the brake ECU 50 receives/reads the detection signal from the acceleration sensor 72. Then, the brake ECU 50 determines whether the lateral acceleration Gy indicates that the vehicle is turning right, and the magnitude |Gy| of the lateral acceleration is equal to or larger than the turning determination threshold Gyref. When the brake ECU determines that the vehicle is turning right (S11: Yes), the brake ECU 50 proceeds to Step S12. Meanwhile, when the brake ECU 50 determines that the vehicle is not turning right (S11: No), the brake ECU 50 proceeds to Step S13, and determines whether or not the vehicle is turning left. In Step S13, the brake ECU 50 receives/reads the detection signal from the acceleration sensor 72. Then, the brake ECU 50 determines whether the lateral acceleration Gy indicates that the vehicle is turning left, and the magnitude |Gy| of the lateral acceleration is equal to or larger than the turning determination threshold Gyref. The brake ECU can determine the turning direction (moving direction) of the vehicle based on the sign (positive or negative) of the lateral acceleration Gy. In addition, the brake ECU 50 can recognize the magnitude of the lateral acceleration Gy based on its absolute value.

When the brake ECU 50 determines that the vehicle is not turning left in Step S13 (that is, the brake ECU 50 determines that the vehicle is neither turning right nor turning left), the brake ECU 50 proceeds to Step S15.

When the brake ECU 50 determines that the vehicle is turning right (S11: Yes), the brake ECU 50 sets, as the reference wheel, the left front wheel 12FL which is the outer front wheel in Step S12.

On the other hand, when the brake ECU 50 determines that the vehicle is turning left (S13: Yes), the brake ECU 50 sets, as the reference wheel, the right front wheel 12FR which is the outer front wheel in Step S14.

When the brake ECU 50 determines that the vehicle is neither turning right nor turning left (S13: No), the brake ECU 50 sets correction amounts of the slip ratio deviations of all the wheels to zero in Step S15. Therefore, when determining that the vehicle is neither turning right nor turning left, the brake ECU 50 performs the rear-wheel EBD control. In the rear-wheel EBD control, the correction amount of the slip ratio deviation of the right rear wheel and the correction amount of the slip ratio deviation of the left rear wheel are set to zero. In this manner, the correcting processing of the slip ratio deviation is not executed in the rear-wheel EBD control. As described later, the correcting processing of the slip ratio deviation is executed in the front/rear-wheel EBD control.

As the brake ECU 50 sets the reference wheel in Step S12 or S14, in Step S16, the brake ECU 50 calculates a slip ratio deviation $\Delta S_{Fin}$ of the inner front wheel, a specific slip ratio deviation $\Delta S_{Fin}'$ of the inner front wheel, a slip ratio deviation $\Delta S_{Rin}$ of the inner rear wheel, and a slip ratio deviation $\Delta S_{Rout}$ of the outer rear wheel in accordance with the following Expressions (1) to (4).

The inner front wheel is the right front wheel 12FR when the vehicle is turning right. The inner front wheel is the left front wheel 12FL when the vehicle is turning left.

The inner rear wheel is the right rear wheel 12RR when the vehicle is turning right. The inner rear wheel is the left rear wheel 12RL when the vehicle is turning left.

The outer rear wheel is the left rear wheel 12RL when the vehicle is turning right. The outer rear wheel is the right rear wheel 12RR when the vehicle is turning left.

$$\Delta S_{Fin} = S_{ref} - S_{Fin} \quad (1)$$

$$\Delta S_{Fin}' = \Delta S_{Fin} \times (Wf/Wr) \quad (2)$$

$$\Delta S_{Rin} = S_{ref} - S_{Rin} \quad (3)$$

$$\Delta S_{Rout} = S_{ref} - S_{Rout} \quad (4)$$

Here, $S_{ref}$ represents the slip ratio of the reference wheel (outer front wheel), $S_{Fin}$ represents the slip ratio of the inner front wheel, $S_{Rin}$ represents the slip ratio of the inner rear wheel, and $S_{Rout}$ represents the slip ratio of the outer rear wheel. Those slip ratios $S_{ref}$, $S_{Fin}$, $S_{Rin}$ and $S_{Rout}$ are actual slip ratios calculated from the detection signals of the respective wheel speed sensors 70. In this embodiment, the slip ratio is calculated by the following Expression (5).

$$\text{Slip ratio}=((\text{"wheel speed"}-\text{"vehicle body speed"})/\text{"vehicle body speed"})\times 100(\%) \quad (5)$$

Therefore, the slip ratio at the time of braking becomes a negative value. Here, when describing the magnitude of the slip ratio (degree of slip), the "magnitude" refers to the absolute value of the slip ratio. The expression "the slip ratio is large" means that the absolute value of the slip ratio is large. In the relational expression using the slip ratio herein, it is expressed in consideration of the sign of the slip ratio.

In addition, (Wf/Wr) in Expression (1) represents a ratio of a ground contact load Wf of the inner front wheel to a ground contact load Wr of the inner rear wheel. Hereinafter, (Wf/Wr) is referred to as "first load ratio". For example, the ground contact load Wf of the inner rear wheel may be calculated in accordance with the following Expression: (Wf=Wf0+$\Delta$Wx−$\Delta$Wy). For obtaining the ground contact load Wf, a load shift amount $\Delta$Wx which is a load shift amount in the front and rear direction of the vehicle due to braking is added to a load Wf0 at the time of straight traveling at a constant speed, and a load shift amount $\Delta$Wy which is a load shift amount in the right and left direction of the vehicle is subtracted therefrom. The ground contact load Wr of the inner rear wheel may be calculated in accordance with the following Expression: (Wr=Wr0−ΔWx−ΔWy). For obtaining the ground contact load Wr, the load shift amount ΔWx and the load shift amount ΔWy are subtracted from a load Wr0 at the time of straight traveling at a constant speed.

The reason for multiplying the first load ratio (Wf/Wr) in Expression (2) is to convert the slip ratio deviation $\Delta S_{Fin}$ into the slip ratio deviation required to generate on the rear wheel the braking force corresponding to the slip ratio deviation of the front wheel. Therefore, the first load ratio (Wf/Wr) also refers to a conversion factor for the braking force.

The load shift amount ΔWx is calculated in accordance with the following Expression (6).

$$\Delta Wx = M \cdot |Gx| \cdot H/L \quad (6)$$

Here, M represents a weight of the vehicle, H represents a height of the center of gravity of the vehicle, and L represents a wheel base of the vehicle, which are known values. Gx is an acceleration (longitudinal acceleration) in the front and rear direction of the vehicle, and is a value detected by the acceleration sensor 72.

Further, the load shift amount ΔWy is calculated by the following Expression (7).

$$\Delta Wy = M \cdot |Gy| \cdot H \cdot \varphi f/D \quad (7)$$

Here, D represents a tread of the vehicle, and φf represents a roll stiffness distribution ratio.

Next, in Step S17, the brake ECU 50 calculates a braking force limit of the inner rear wheel. In this step, the brake ECU 50 confirms/determines whether or not the braking force of the inner rear wheel has already reached a lower limit to which the braking force can be decreased. That is, the brake ECU 50 confirms/determines whether or not the pressure in the wheel cylinder of the inner rear wheel is zero or a value close to zero.

Next, in Step S18, the brake ECU 50 determines whether or not the slip ratio deviation $\Delta S_{Fin}$ of the inner front wheel is a positive value ($\Delta S_{Fin} > 0$). When the slip ratio deviation $\Delta S_{Fin}$ is a positive value, this indicates that the degree of slip of the inner front wheel is larger than that of the outer front wheel. When the slip ratio deviation $\Delta S_{Fin}$ is a positive value (S18: Yes), the brake ECU 50 proceeds to Step S19.

On the other hand, when the slip ratio deviation $\Delta S_{Fin}$ of the inner front wheel is not a positive value (S18: No), it is estimated that a spin yaw moment is not generated. Therefore, the brake ECU 50 proceeds to Step S15 to set the correction amounts of the slip ratio deviations of all the wheels to zero. In this case, the rear-wheel EBD control is performed. After the brake ECU 50 executes the processing of Step S15, the brake ECU 50 tentatively terminates this correcting processing routine. As described above, the brake ECU 50 repeatedly executes the correcting processing routine every time the predetermined calculation period elapses.

In Step S19, the brake ECU 50 whether or not the current situation is a first specific situation. The first specific situation refers to a situation in which the whole of the control amount of the inner front wheel can be used for the control amount of the inner rear wheel. The brake ECU 50 determines whether or not the current situation is the first specific situation by using the following Conditions 1, 2 and 3.

Condition 1: The braking force of the inner rear wheel has not yet reached the braking force limit. That is, the pressure in the wheel cylinder of the inner rear wheel is not zero (or a value close to zero).

Condition 2: The slip ratio deviation $\Delta S_{Rin}$ of the inner rear wheel is a negative value ($\Delta S_{Rin} < 0$).

Condition 3: an absolute value $|\Delta S_{Fin}'|$ of the specific slip ratio deviation of the inner front wheel is equal to or smaller than an absolute value $|\Delta S_{Rin}|$ of the slip ratio deviation of the inner rear wheel ($|\Delta S_{Fin}'| \le |\Delta S_{Rin}|$).

Conditions Under which the Current Situation is Determined to be the First Specific Situation: Condition 1 or (Condition 2 and Condition 3)

When Condition 2 is satisfied, this indicates that the degree of slip of the inner rear wheel is smaller than the degree of slip of the reference wheel, that is, the braking pressure of the inner rear wheel is to be increased (a spin yaw moment is to be increased on the inner rear wheel). In this situation, it is required to decrease the braking pressure of the inner rear wheel (stop the increase of the braking pressure).

When Condition 3 is satisfied, this indicates that the control amount for decreasing the braking pressure of the inner front wheel (i.e., control amount for increasing an anti-spin yaw moment) is equal to or smaller than the control amount for increasing the braking pressure of the inner rear wheel (i.e., control amount for increasing a spin yaw moment).

The brake ECU 50 determines that the current situation is the first specific situation when Condition 1 is satisfied or when both of Conditions 2 and 3 are satisfied.

When the brake ECU 50 determines that the current situation is the first specific situation (S19: Yes), in Step S20, the brake ECU 50 sets a correction amount $\Delta S_{hoseiFin}$ of the slip ratio deviation of the inner front wheel, a correction amount $\Delta S_{hoseiFout}$ of the slip ratio deviation of the outer front wheel, a correction amount $\Delta S_{hoseiRin}$ of the slip ratio deviation of the inner rear wheel, and a correction amount $\Delta S_{hoseiRout}$ of the slip ratio deviation of the outer rear wheel in accordance with the following Expressions (8) to (11).

$$\Delta S_{hoseiFin} = -\Delta S_{Fin} \quad (8)$$

$$\Delta S_{hoseiFout} = 0 \quad (9)$$

$$\Delta S_{hoseiRin} = +\Delta S_{Fin}' \quad (10)$$

$$\Delta S_{hoseiRout} = 0 \quad (11)$$

The slip ratio deviation of the inner front wheel after the correcting processing is changed to a value obtained by adding the correction amount ($-\Delta S_{Fin}$) to the slip ratio deviation ($\Delta S_{Fin}$) before the correcting processing. As a result, the slip ratio deviation ($\Delta S_{Fin}$) of the inner front wheel becomes zero after the correcting processing.

Further, the slip ratio deviation of the inner rear wheel after the correcting processing is changed to a value obtained by adding the correction amount ($+\Delta S_{Fin}'$) to the slip ratio deviation ($\Delta S_{Rin}$) before the correcting processing ($\Delta S_{Rin} = \Delta S_{Rin} + \Delta S_{Fin}'$).

Both of the correction amount $\Delta S_{hoseiFout}$ of the slip ratio deviation of the outer front wheel and the correction amount $\Delta S_{hoseiRout}$ of the slip ratio deviation of the outer rear wheel are set to zero.

Through the above processing, the slip ratio deviation of the inner front wheel becomes zero after the correcting processing. Further, the slip ratio deviation of the inner rear wheel is corrected in such a manner that the control amount of the inner front wheel is added to the control amount of the inner rear wheel. Here, the control amount of the inner front wheel is a control amount corresponding to the braking force which would generate an anti-spin yaw moment on the inner front wheel (if the correcting processing is not performed). The whole of such a control amount of the inner front wheel for generating an anti-spin yaw moment on the inner front wheel can be used for the control amount of the inner rear wheel.

When the brake ECU 50 determines that the current situation is not the first specific situation (S19: No), in Step S21, the brake ECU 50 determines whether or not the current situation is a second specific situation. The second specific situation refers to a situation in which a part of the control amount of the inner front wheel can be used for the control amount of the inner rear wheel. The brake ECU 50 determines whether or not the current situation is the second specific situation by using the following Conditions 21, 22, and 23.

Condition 21: The braking force of the inner rear wheel has already reached the braking force limit. That is, the pressure in the wheel cylinder of the inner rear wheel is zero or a value close to zero.

Condition 22: The slip ratio deviation $\Delta S_{Rin}$ of the inner rear wheel is a negative value ($\Delta S_{Rin}<0$).

Condition 23: The absolute value $|\Delta S_{Fin}'|$ of the specific slip ratio deviation of the inner front wheel is larger than the absolute value $|\Delta S_{Rin}|$ of the slip ratio deviation or the inner rear wheel ($|\Delta S_{Fin}'|>|\Delta S_{Rin}|$).

Condition Under which the Current Situation is Determined to be the Second Specific Situation: Condition 21 and Condition 22 and Condition 23

When Condition 23 is satisfied, this indicates that the control amount for decreasing the braking pressure of the inner front wheel (i.e., control amount for increasing an anti-spin yaw moment) is larger than the control amount for increasing the braking pressure of the inner rear wheel (i.e., control amount for increasing a spin yaw moment). In this situation, only an "amount corresponding to the control amount of the inner rear wheel for increasing the braking pressure" in the control amount of the inner front wheel can be added (distributed) to the control amount of the inner rear wheel. In this manner, a part of the control amount of the inner front wheel is added to the control amount of the inner rear wheel.

The brake ECU 50 determines that the current situation is the second specific situation when all of Condition 21, Condition 22 and Condition 23 are satisfied.

When the brake ECU 50 determines that the current situation is the second specific situation (S21: Yes), in Step S22, the brake ECU 50 sets a specific slip ratio deviation $\Delta S_{Rin}'$ of the inner rear wheel, the correction amount $\Delta S_{hosiFin}$ of the slip ratio deviation of the inner front wheel, the correction amount $\Delta S_{hoseiFout}$ of the slip ratio deviation of the outer front wheel, the correction amount $\Delta S_{hoseiRin}$ of the slip ratio deviation of the inner rear wheel, and the correction amount $\Delta S_{hoseiRout}$ of the slip ratio deviation of the outer rear wheel in accordance with the following Expressions (12) to (16).

$$\Delta S_{Rin}'=\Delta S_{Rin}\times(Wr/Wf) \quad (12)$$

$$\Delta S_{hoseiFin}=+\Delta S_{Rin}' \quad (13)$$

$$\Delta S_{hoseiFout}=0 \quad (14)$$

$$\Delta S_{hoseiRin}=-\Delta S_{Rin} \quad (15)$$

$$\Delta S_{hoseiRout}=0 \quad (16)$$

In addition, (Wr/Wf) in Expression (12) represents a ratio of the ground contact load Wr of the inner rear wheel to the ground contact load Wf of the inner front wheel. Hereinafter, (Wr/Wf) is referred to as "second load ratio". The second load ratio is the reciprocal of the first load ratio (Wf/Wr) in Expression (2).

As a result, the slip ratio deviation of the inner front wheel after the correcting processing is changed to a value obtained by adding the correction amount ($+\Delta S_{Rin}'$) to the slip ratio deviation ($\Delta S_{Fin}$) before the correcting processing ($\Delta S_{Fin}=\Delta S_{Fin}+\Delta S_{Rin}'$).

Further, the slip ratio deviation of the inner rear wheel after the correcting processing is changed to a value obtained by adding the correction amount ($-\Delta S_{Rin}$) to the slip ratio deviation ($\Delta S_{Rin}$) before the correcting processing ($\Delta S_{Rin}=\Delta S_{Rin}-\Delta S_{Rin}$). The slip ratio deviation of the inner rear wheel becomes zero after the correcting processing.

Both of the correction amount $\Delta S_{hoseiFout}$ of the slip ratio deviation of the outer front wheel and the correction amount $\Delta S_{hoseiRout}$ of the slip ratio deviation of the outer rear wheel are set to zero.

Through the above processing, the slip ratio deviation of the inner rear wheel is corrected to be zero. Further, the amount corrected in the inner rear wheel (i.e., correction amount to convert to the slip ratio deviation required to generate the braking force) is added to the slip ratio deviation of the inner front wheel to thereby correct the slip ratio deviation of the inner front wheel. Therefore, it is possible to prevent excessive addition of the control amount of the inner front wheel to the control amount of the inner rear wheel. Further, an anti-spin yaw moment can be generated on the inner front wheel through use of the remaining control amount of the inner front wheel which is not added to the control amount of the inner rear wheel.

When the brake ECU 50 determines that the current situation is not the second specific situation (S21: No), the brake ECU 50 proceeds to Step S23 to set the correction amounts of the slip ratio deviations of all the wheels to zero. Therefore, an anti-spin yaw moment can be generated on the inner front wheel through use of the control amount corresponding to the slip ratio deviation of the inner front wheel.

After the brake ECU 50 calculates the correction amounts of the slip ratio deviations in Step S20, S22, S23 or S15, the brake ECU 50 tentatively terminates this correcting processing routine. The brake ECU 50 repeatedly executes the correcting processing routine every time the predetermined calculation period elapses.

<Calculation of Braking Force>

Next, a method of calculating the braking force generated in the EBD control will be described with reference to a control block diagram illustrated in FIG. 4. The brake ECU 50 corrects the slip ratio deviations based on the correction amounts calculated in the correcting processing routine of FIG. 3. Then, the brake ECU 50 calculates the target braking forces for all the wheels through feedback control based on the slip ratio deviations ($\Delta S_{Fin}$, $\Delta S_{Fout}$, $\Delta S_{Rin}$, and $\Delta S_{Rout}$) after the correcting processing. Hereinafter, the slip ratio deviation after the correcting processing is referred to as "slip ratio deviation $\Delta S$" unless it is required to distinguish between the slip ratio deviations ($\Delta S_{Fin}$, $\Delta S_{Fout}$, $\Delta S_{Rin}$, and $\Delta S_{Rout}$). While the front/rear-wheel EBD control is being performed, the slip ratio deviation $\Delta S_{Fout}$ of the outer front wheel is zero because the outer front wheel is the reference wheel. While the rear-wheel EBD control is being performed, the slip ratio deviations $\Delta S_{Fin}$ and $\Delta S_{Fout}$ are zero because the right and left front wheels are not subject to the braking force control.

Figure 4:
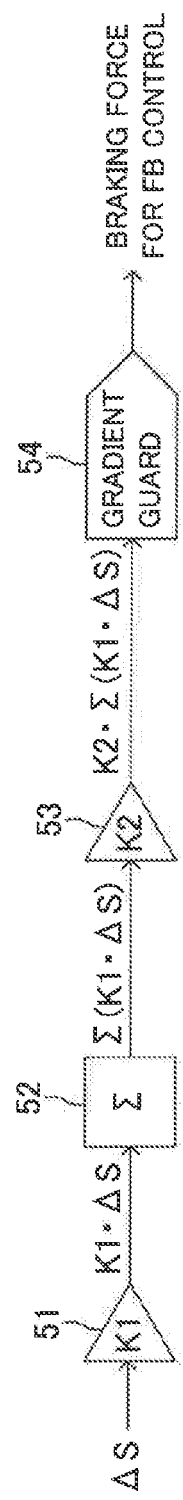
FIG. 4 is a block diagram for illustrating a calculating processing for feedback control.

FIG. 4 is a control block diagram for calculating the braking force. The calculation of the braking force is repeatedly executed in this order for example, the right front wheel 12FR, the left front wheel 12FL, the right rear wheel 12RR, and the left rear wheel 12RL. Hereinafter, the "wheel for which the braking force is calculated" is referred to as "subject wheel". As illustrated in FIG. 4, the slip ratio deviation $\Delta S$ is input to a FB (feedback) control amount calculating module 51 every time a predetermined calculation period elapses. Every time the slip ratio deviation $\Delta S$ of the subject wheel is input, the FB control amount calculating module 51 multiplies that slip ratio deviation $\Delta S$ by a FB gain K1. The FB gain K1 is a proportional coefficient indicative of a characteristic of a proportional relationship between the slip ratio of the wheel and the braking force, and is a value called braking stiffness. The calculation result (K1·$\Delta S$) of the FB control amount calculating module 51 is output to an integrating module 52 every time that calculation is executed. The output (K1·$\Delta S$) of the FB control amount calculating module 51 represents a feedback control amount. The feedback control amount (K1·$\Delta S$) becomes a value for decreasing the degree of slip of the subject wheel (for decreasing the braking pressure) when the degree of slip of the subject wheel is larger than the target slip degree (target slip ratio). The feedback control amount (K1·$\Delta S$) becomes a value for increasing the degree of slip of the subject wheel (for increasing the braking pressure) when the degree of slip of the subject wheel is smaller than the target slip degree (target slip ratio). The output (K1·$\Delta S$) of the FB control amount calculating module 51 is a feedback control amount for increasing the braking pressure when the sign thereof is positive. The output (K1·$\Delta S$) is a feedback control amount for decreasing the braking pressure when the sign thereof is negative. Therefore, correcting the slip ratio deviation $\Delta S$ as described above means correcting the feedback control amount.

Every time the output (K1·$\Delta S$) of the FB control amount calculating module 51 is input, the integrating module 52 adds the input value to an integrated value up to that time point. The integrating module 52 outputs the integrated value ($\Sigma$(K1·$\Delta S$)), which is the integration result, to a load gain multiplying module 53.

Every time the output ($\Sigma$(K1·$\Delta S$)) of the integrating module 52 is input, the load gain multiplying module 53 multiplies the value ($\Sigma$(K1·$\Delta S$)) by a load gain K2. The load gain multiplying module 53 outputs the multiplication result (K2·$\Sigma$(K1·$\Delta S$)) to a gradient guard module 54. The load gain K2 is a value corresponding to the ground contact load of the subject wheel. The reason why the load ratio is used in the correcting processing of the slip ratio deviation as described above is that the load gain multiplying module 53 multiplies the value ($\Sigma$(K1·$\Delta S$)) by the load gain K2 corresponding to the ground contact load. That is, in the case where the control amount of the inner front wheel is added to the control amount of the inner rear wheel, it is required to convert the correction amount of the slip ratio deviation through use of the ratio of the braking force.

When a change gradient of the input value exceeds a predetermined upper limit gradient, the gradient guard module 54 converts the input put into a value limited to the upper limit gradient, and outputs the value. The output value of the gradient guard module 54 corresponds to the braking force under the EBD control. This braking force corresponds to a braking force generated through the feedback control based on the slip ratio deviation. Therefore, a final target braking force applied to the wheel is the sum of the braking force at the start of the EBD control and the output value (braking force to be generated through the feedback control) of the gradient guard module 54.

The brake ECU 50 controls the brake actuator 23 so as to generate the target braking force calculated in the above manner for each wheel.

<Understeer Suppression Control>

In the EBD control according to this embodiment, the braking force control based on the slip ratio deviation is performed not only on the right and left rear wheels but also on the right and left front wheels. In such EBD control, there is a possibility that an anti-slip yaw moment becomes excessive, and thus, the vehicle may exhibit an understeer behavior.

Figure 5:
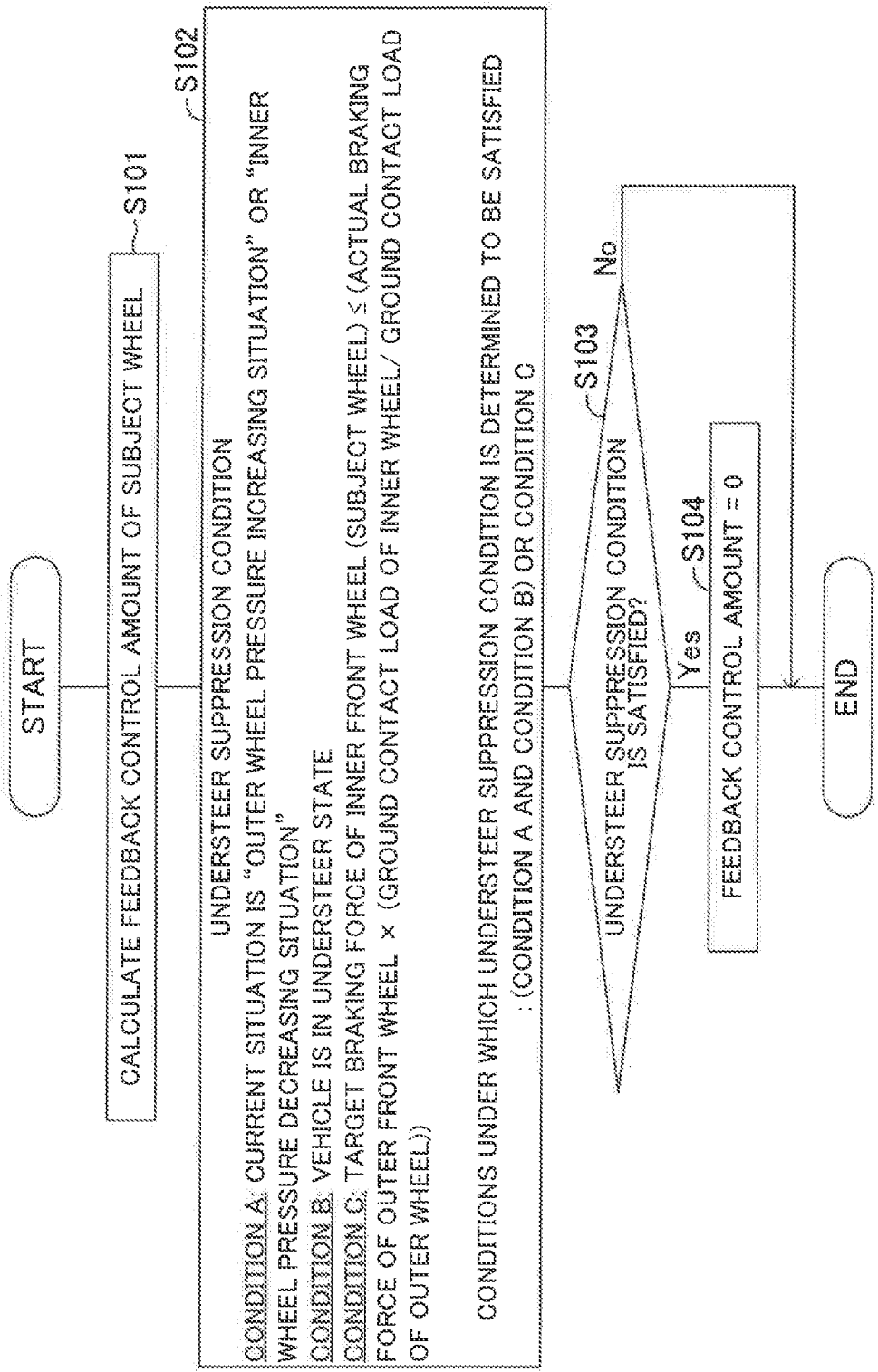
FIG. 5 is a flowchart for illustrating an understeer suppression control routine executed by the brake ECU.

In view of the above, the brake ECU 50 preforms understeer suppression control when performing the front/rear-wheel EBD control. FIG. 5 illustrates an understeer suppression control routine executed by the brake ECU 50. The understeer suppression control routine is a routine for limiting the feedback control amount in the above-described calculation processing executed by the FB control amount calculating module 51.

The brake ECU 50 repeatedly executes, every time a predetermined calculation period elapses, the understeer suppression control routine sequentially for each of the four wheels (the right and left front wheels, and the right and left rear wheels). For example, the under-steer suppression control routine is repeatedly executed in this order: for example, the right front wheel 12FR, the left front wheel 12FL, the right rear wheel 12RR, and the left rear wheel 12RL. Hereinafter, the "wheel for which the understeer suppression control routine is executed" is referred to as "subject wheel".

In Step S101, for the subject wheel, the brake ECU 50 multiplies the slip ratio deviation $\Delta S$ corrected in the above manner by the FB gain K1 to thereby obtain the feedback control amount (K1·$\Delta S$). This processing is executed by the FB control amount calculating module 51 as described above. If the subject wheel is the reference wheel, since the slip ratio deviation $\Delta S$ is zero, the feedback control amount (K1·$\Delta S$) is zero.

Next, in Step S102, the brake ECU 50 determines whether or not the following understeer suppression condition is satisfied.

The understeer suppression condition includes the following Conditions A, B and C.

Condition A: The current situation is an "outer wheel pressure increasing situation" or an "inner wheel pressure decreasing situation".

Condition B: It is estimated that the vehicle is in an understeer state.

Condition C: The subject wheel is the inner front wheel, and the target braking force of the subject wheel is equal to or smaller than a value obtained by multiplying an actual braking force of the wheel (in this case, the outer front wheel) on the opposite side to the subject wheel by a load ratio (Wf_in/Wf_out).

Conditions Under which the Understeer Suppression Condition is Determined to be Satisfied: ((Condition A and Condition B) or Condition C)

Here, the brake ECU 50 determines that the understeer suppression condition is satisfied when both of Condition A and Condition B are satisfied or when Condition C is satisfied.

The "outer wheel pressure increasing situation" in Condition A refers to a situation in which the subject wheel is an outer wheel, and the braking pressure for the subject wheel is to be increased. The term "outer wheel" refers to the wheel on the outer side with respect to the turning direction of the vehicle. The "inner wheel pressure decreasing situation" in Condition A refers to a situation in which the subject wheel is an inner wheel, and the braking pressure for the subject wheel is to be decreased. The term "inner wheel" refers to the wheel on the inner side with respect to the turning direction of the vehicle. When the feedback control amount (K1·ΔS) of the subject wheel is a positive value, this indicates that the current situation is a situation in which the braking pressure is to be increased (the braking force is to be controlled to be increased). When the feedback control amount (K1·ΔS) of the subject wheel is a negative value, this indicates that the current situation is a situation in which the braking pressure is to be decreased (the braking force is to be controlled to be decreased). Therefore, the brake ECU 50 can determine whether or not Condition A is satisfied based on the feedback control amount (K1·ΔS) of the subject wheel.

When the feedback control amount (K1·ΔS) of the outer wheel is a positive value, this indicates that the outer wheel is to be controlled to generate an anti-spin yaw moment. Meanwhile, when the feedback control amount (K1·ΔS) of the inner wheel is a negative value, this indicates that the inner wheel is to be controlled to generate an anti-spin yaw moment.

Regarding Condition B, when a magnitude of the actual yaw rate YR is smaller than a magnitude of a reference yaw rate YRstd, it is estimated that the vehicle is in the understeer state. For example, the reference yaw rate can be calculated in accordance with the following Expression (17).

$$YRstd = \frac{V \cdot St}{n \cdot L} - Gy \cdot V \cdot Kh \tag{17}$$

Here, V is the vehicle speed, St is the steering angle, Gy is the lateral acceleration, n is a steer overall gear ratio, L is a wheel base of the vehicle, and Kh is a vehicle stability factor. The brake ECU 50 can recognize whether the turning direction of the vehicle is the right direction or the left direction based on the sign of the yaw rate. For example, when the yaw rate is a positive value, the turning direction is the left direction. When the yaw rate is a negative value, the turning direction is the right direction. When the vehicle is turning left, Condition B is set to a condition (YR<YRstd). Meanwhile, when the vehicle is turning right, Condition B is set to a condition (YR>YRstd).

Condition C is a condition used when the subject wheel is the inner front wheel. Only when the subject wheel is the inner front wheel, the brake ECU 50 determines whether or not Condition C is satisfied. In this case, the brake ECU 50 acquires the actual braking force of the outer front wheel on the opposite side to the subject wheel. Then, the brake ECU 50 multiplies the actual braking force of the outer front wheel by the load ratio (Wf_in/Wf_out) to thereby obtain a specific outer front wheel braking force. The brake ECU 50 determines whether or not the magnitude of the target braking force of the subject wheel (inner front wheel) is equal to or smaller than the magnitude of the specific outer front wheel braking force.

The braking force may be expressed as either a positive value or a negative value. The comparison in Condition C is made thorough use of the comparison of the magnitude (absolute value). Therefore, Condition C is expressed as follows.

|Fbr_Fin_target|≤(|Fbr_Fout_real|×(Wf_in/Wf_out))

Here, Fbr_Fin_target is the target braking force of the subject wheel (inner front wheel), Fbr_Fout_real is the actual braking force of the outer front wheel, Wf_in is the ground contact load of the subject wheel (inner front wheel), and Wf_out is the ground contact load of the outer front wheel.

The ground contact load Wf_in of the subject wheel may be calculated in accordance with the following Expression: (Wf_in=Wf_in0+ΔWx−ΔWy). For obtaining the ground contact load Wf_in, the load shift amount ΔWx (see Expression (6)) which is a load shift amount in the front and rear direction of the vehicle due to braking is added to a load Wf_in0 of the subject wheel at the time of straight traveling at a constant speed, and the load shift amount ΔWy (see Expression (7)) which is a load shift amount in the right and left direction of the vehicle is subtracted therefrom. Further, the ground contact load Wf_out of the outer front wheel may be calculated in accordance with the following Expression: (Wf_out=Wf_out0+ΔWx+ΔWy). For obtaining the ground contact load Wf_out, the load shift amount ΔWx which is a load shift amount in the front and rear direction of the vehicle due to braking, and the load shift amount ΔWy which is a load shift amount in the right and left direction of the vehicle are added to a load Wf_out0 of the outer front wheel at the time of straight traveling at a constant speed. In addition, Fbr_Fout_real can be detected based on the pressure in the wheel cylinder of the outer front wheel.

As described above, in the front/rear-wheel EBD control, the outer front wheel is set as the reference wheel, and the FB control amounts of the other three wheels are calculated independently of each other so that the slip ratio of each of the other three wheels follows (becomes close to) the slip ratio of the reference wheel. In order to perform the feedback control for the rear wheels, the whole or a part of the FB control amount of the inner front wheel is used for the FB control amount of the inner rear wheel in some embodiments. In the front/rear-wheel EBD control, basically, the slip ratios of the right and left wheels are controlled/adjusted so as to be a common target value. Hereinafter, such control is referred to as "common slip control". In this embodiment, the FB control amount of the inner front wheel calculated in the common slip control is used for the FB control amount of the inner rear wheel. As a result, the common slip control is not performed.

On the other hand, when the common slip control is performed, the braking force is distributed to each wheel in proportion to the ground contact load of each wheel. When the vehicle is in the understeer state, the understeer suppression control is performed through the limit of the difference in the braking force between the right and left wheels, and therefore, the braking force of the subject wheel can be suppressed (guarded) so as not to generate an excessive anti-spin yaw moment. For Condition C, according to the control concept of the common slip control, when comparing the target braking force of the inner front wheel with the actual braking force of the outer front wheel, the brake ECU 50 multiplies the actual braking force of the outer front wheel by the load ratio. As a result, the braking force of the inner front wheel is limited so as not to provide a difference in the braking force between the right and left wheels which exceeds a distribution ratio of the braking force in the common slip control.

As the brake ECU 50 completes determining each of Conditions A, B and C, in the subsequent step S103, the brake ECU 50 determines whether or not the understeer suppression condition is satisfied based on the determination result in Step 102.

When the brake ECU 50 determines that the understeer suppression condition is satisfied, it is estimated that it is likely to generate an excessive anti-spin yaw moment due to the braking force control for the subject wheel. In such a case, the brake ECU 50 proceeds to Step S104 to correct the feedback control amount (K1·ΔS) of the subject wheel to be zero (K1·ΔS=0). Next, the brake ECU 50 tentatively terminates the understeer suppression control routine. In this case, for example, the FB gain K1 may be set to zero.

On the other hand, when the brake ECU 50 determines that the understeer suppression condition is not satisfied (S103: No), it is estimated that an excessive anti-spin yaw moment is not generated due to the braking force control for the subject wheel. Therefore, the brake ECU 50 skips the processing of Step S104, and tentatively terminates the understeer suppression control routine. Therefore, the brake ECU 50 does not correct the feedback control amount (K1·ΔS) of the subject wheel. That is, the value (K1·ΔS) is used as the feedback control amount as it is.

The feedback control amount is output to the integrating module 52 as described above.

For example, when Condition B is satisfied, it is estimated that the vehicle is in the understeer state. In such a situation, when the feedback control amount (K1·ΔS) of the subject wheel is a value for generating an anti-spin yaw moment (Condition A is satisfied), the feedback control amount of the subject wheel may act to strengthen the understeer state of the vehicle. On the other hand, when the feedback control amount (K1·ΔS) of the subject wheel is not a value for generating an anti-spin yaw moment (Condition A is not satisfied), even in a situation in which the vehicle is in the understeer state, the feedback control amount of the subject wheel acts to weaken the understeer state of the vehicle.

Therefore, the brake ECU 50 determines whether or not the feedback control amount (K1·ΔS) of the subject wheel is set to a value for generating an anti-spin yaw moment. Then, when AND condition of the Condition A and Condition B is satisfied, the feedback control amount (K1·ΔS) of the subject wheel is set to zero. Therefore, when the feedback control amount (K1·ΔS) of the subject wheel is a value for generating an anti-spin yaw moment, it is possible to prevent from strengthening the understeer state of the vehicle.

On the other hand, when the feedback control amount (K1·ΔS) of the subject wheel is not a value for generating an anti-spin yaw moment, the feedback control amount (K1·ΔS) of the subject wheel acts to weaken the understeer state of the vehicle. By using the feedback control amount (K1·ΔS) of the subject wheel effectively, it is possible to prevent the vehicle from being in the understeer state.

Regarding Condition C, when the target braking force of the subject wheel (inner front wheel) is equal to or smaller than the specific outer front wheel braking force of the outer front wheel which is the wheel on the opposite side to the subject wheel, the feedback control amount of the subject wheel is set to zero so as not to generate an excessive anti-spin yaw moment. Here, the specific outer front wheel braking force is a value obtained by multiplying the actual braking force by the load ratio (Wf_in/Wf_out). Therefore, it is possible to appropriately limit the braking force of the subject wheel.

In the brake control apparatus according to this embodiment described above, when it is determined that the vehicle is in a predetermined turning state, the front/rear-wheel EBD control is performed. In this front/rear-wheel EBD control, the outer front wheel is set as the reference wheel, and the braking force for each of the other three wheels is controlled so that the slip ratio of each of the other three wheels matches the slip ratio of the reference wheel. In this configuration, the control amount of the inner front wheel is used for the control amount of the inner rear wheel. Specifically, the slip ratio deviation of the inner front wheel is corrected to be zero, and an amount (amount obtained by converting the correction amount by using the braking force ratio) corresponding to the corrected amount in the inner front wheel is added to the slip ratio deviation of the inner rear wheel.

Accordingly, an anti-spin yaw moment can be generated through the braking force control for the inner rear wheel without performing the braking force control for the inner front wheel. Further, when the braking force of the inner rear wheel has reached the braking force limit, an additional anti-spin yaw moment can be generated by decreasing the braking pressure of the inner front wheel so as to compensate for the lack of the anti-spin yaw moment.

The braking force is controlled by using the inner rear wheel of which the change (correction amount) in the vehicle behavior is smaller than that in the inner front wheel in some embodiments. Therefore, the stability of the vehicle turning behavior can be further enhanced. Further, it is possible to prevent from degrading the noise performance and the vibration performance of the brake actuator 23 as much as possible. Further, since the outer front wheel with the smallest degree of slip is set as the reference wheel, the front/rear-wheel EBD control can be performed appropriately.

While the front/rear-wheel EBD control is being performed, the brake ECU 50 executes the understeer suppression control routine. When the wheel on which an anti-spin yaw moment is to be generated is detected in a situation in which it is estimated that the vehicle is in the understeer state, the feedback control amount of that wheel is set to zero. Therefore, it is possible to prevent the vehicle from being in the understeer state appropriately.

When the target braking force of the inner front wheel becomes equal to or smaller than the specific outer front wheel braking force, the feedback control amount of the inner front wheel is corrected to be zero. The specific outer front wheel braking force is a value obtained by multiplying the actual braking force of the outer front wheel by the load ratio (Wf_in/Wf_out). Therefore, it is possible to prevent the vehicle from being in the understeer state through the comparison with the braking force suitable for the common slip control in which the braking force is distributed to the wheel in proportion to the ground contact load.

In the above, the brake control apparatus for the vehicle according to the embodiment has been described, but the present disclosure is not limited to the above-mentioned embodiment, and various changes are possible within the range not departing from the technical scope of the present disclosure.

In the above embodiment, the understeer suppression condition includes Conditions A, B and C. However, the understeer suppression condition need not include all of Conditions A, B and C. For example, the understeer suppression condition may include only Condition A and Condition B.

In the above embodiment, when the understeer suppression condition is satisfied, the brake ECU 50 sets to zero the feedback control amount of the wheel which is to be controlled so as to increase an anti-spin yaw moment. However, the brake ECU 50 need not set the feedback control amount to zero. The brake ECU 50 may be configured to perform a correcting processing to decrease a magnitude (absolute value) of the feedback control amount (make the feedback control amount close to zero).

In the above embodiment, the control amount of the inner front wheel is used only for the control amount of the inner rear wheel. The correcting processing is not limited to this example. The control amount of the inner front wheel may be divided in half. A half thereof may be added/distributed to the control amount of the inner rear wheel, and the other half may be added/distributed to the control amount of the outer rear wheel. In this configuration, for the outer rear wheel, it is required to distribute the half of the control amount of the inner front wheel so as to increase the braking force. For this reason, the half of the specific slip ratio deviation $\Delta S_{Fin}'$ of the inner front wheel is added to the slip ratio deviation $\Delta S_{Rin}$ of the inner rear wheel, and the other half of the specific slip ratio deviation $\Delta S_{Fin}'$ of the inner front wheel is subtracted from the slip ratio deviation $\Delta S_{Rout}$ of the outer rear wheel. In another example, the control amount of the inner front wheel may be used only for the control amount of the outer rear wheel. In this example, the slip ratio deviation $\Delta S_{Rout}$ of the outer rear wheel may be corrected to be decreased by the specific slip ratio deviation $\Delta S_{Fin}'$ of the inner front wheel.

In the embodiment, the brake ECU 50 directly correct/modifies the slip ratio deviation to thereby correct the braking force. However, the target slip ratio or the actual slip ratio may be corrected/modified through use of the correction amount of the slip ratio deviation. Also in this example, the slip ratio deviation is corrected to thereby correct the braking force finally.

What is claimed is:

1. A brake control apparatus for a vehicle configured to generate an anti-spin yaw moment in a direction opposite to a spin yaw moment generated through a load movement in a right and left direction of the vehicle, the brake control apparatus comprising:
    a brake device configured to control braking forces of right and left front wheels, and right and left rear wheels independently of each other;
    a slip degree detector configured to detect a slip degree for each of the right and left front wheels, and the right and left rear wheels;
    a rear braking force controller configured to control the braking forces of the right and left rear wheels independently of each other through feedback control based on a rear wheel slip deviation so that the slip degree of each of the right and left rear wheels becomes close to a target slip degree, the rear wheel slip deviation including a deviation between the target slip degree and the slip degree of the right rear wheel, and a deviation between the target slip degree and the slip degree of the left rear wheel;
    a turning state detector configured to detect a turning state of the vehicle; and
    a front braking force controller configured to, when the turning state of the vehicle is detected by the turning state detector, control the braking force of an inner front wheel, which is the front wheel on an inner side with respect to a turning direction of the vehicle from among the right and left front wheels, through feedback control based on a front wheel slip deviation so that the slip degree of the inner front wheel becomes close to the slip degree of an outer front wheel as a reference wheel, which is the front wheel on an outer side with respect to the turning direction of the vehicle from among the right and left front wheels, the front wheel slip deviation being a deviation between the slip degree of the reference wheel and the slip degree of the inner front wheel,
    wherein the brake control apparatus further comprises:
    a vehicle state estimation module configured to estimate whether or not the vehicle is in an understeer state in a situation in which the front braking force controller is controlling the braking force of the inner front wheel; and
    an understeer suppressing module configured to, when the vehicle state estimation module has estimated that the vehicle is in the understeer state, decrease a feedback control amount of the wheel which is to be controlled to increase the anti-spin yaw moment.

2. The brake control apparatus according to claim 1, wherein the rear braking force controller is further configured to set the target slip degree to the same value as the slip degree of the outer front wheel.

3. The brake control apparatus according to claim 1, further comprising a correcting module configured to:
    perform a first correcting processing so that a feedback control amount of the inner front wheel based on the front wheel slip deviation is corrected to be zero; and
    perform a second correcting processing so that a feedback control amount of an inner rear wheel, which is the rear wheel on the inner side with respect to the turning direction of the vehicle from among the right and left rear wheels, is corrected by an amount corresponding to a corrected amount of the feedback control amount of the inner front wheel.

4. The brake control apparatus according to claim 3, further comprising an inner front wheel braking force guard module configured to:
    calculate a relationship between a specific outer front wheel braking force and a target braking force of the inner front wheel, the specific outer front wheel braking force being a value obtained by multiplying an actual braking force of the outer front wheel by a load ratio which is a ratio of a ground contact load of the inner front wheel to a ground contact load of the outer front wheel; and
    correct the feedback control amount of the inner front wheel to be zero when the target braking force of the inner front wheel becomes equal to or smaller than the specific outer front wheel braking force.

5. The brake control apparatus according to claim 3, wherein the correcting module is further configured to correct the feedback control amount of the inner front wheel based on the front wheel slip deviation in such a manner that the front wheel slip deviation is corrected to be zero.

6. The brake control apparatus according to claim 1, further comprising a yaw rate sensor,
    wherein the vehicle state estimation module is configured to:
    compare a yaw rate detected by the yaw rate sensor with a reference yaw rate; and
    estimate that the vehicle is in the understeer state when a magnitude of the detected yaw rate is smaller than a magnitude of the reference yaw rate.

* * * * *